Jan. 14, 1930. A. ALLEN 1,743,302
METHOD AND MEANS FOR CONTROLLING FEED OF RUBBER CALENDERS
Filed Dec. 15, 1926 2 Sheets-Sheet 2
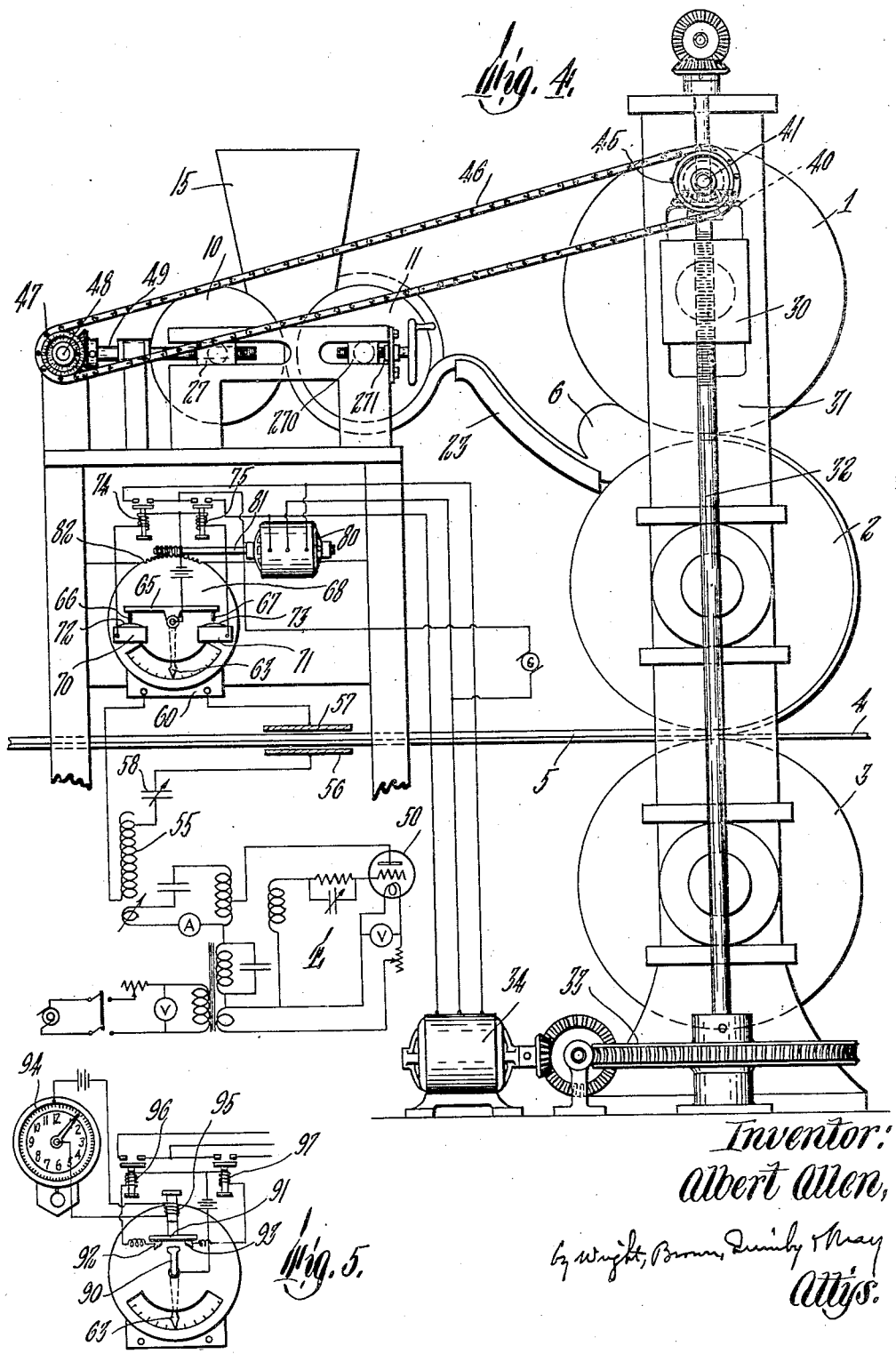

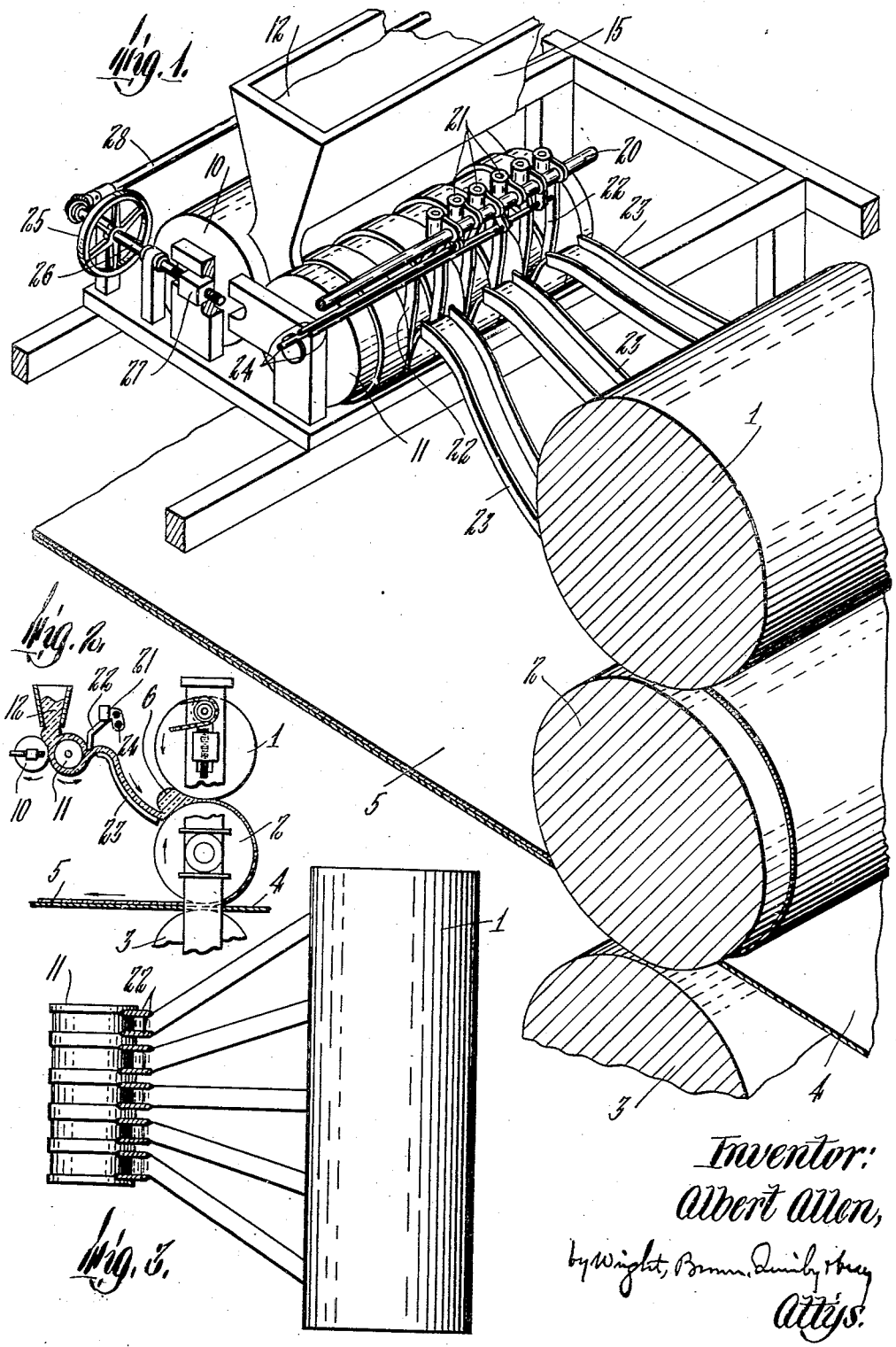

Patented Jan. 14, 1930

1,743,302

UNITED STATES PATENT OFFICE

ALBERT ALLEN, OF WINCHESTER, MASSACHUSETTS, ASSIGNOR TO ATLANTIC PRECISION INSTRUMENT COMPANY, OF BOSTON, MASSACHUSETTS, A CORPORATION OF MASSACHUSETTS

METHOD AND MEANS FOR CONTROLLING FEED OF RUBBER CALENDERS

Application filed December 15, 1926. Serial No. 155,088.

In the art of making sheets or continuous webs of rubber, either spread upon fabrics as for tire casings or rubber shoes, or unsupported as for inner tubes or tires, the customary procedure is as follows:

The rubber and compounding materials are mixed to a relatively homogeneous mass by "milling" between heavy rolls for a considerable time. The mass of compounded rubber adheres to one of the rolls and is kneaded by the other until it has reached the required consistency and evenness of mixture, thereupon the attendant cuts and pulls off a substantial amount by means of a knife and feeds it to the calender, which is the machine used for spreading the rubber upon the fabric, or rolling it out into the required sheets. The method of feeding the calender and the means for carrying this method into effect are the subject matter of the improvements herein disclosed.

In the present practice the relatively large pieces of rubber taken from the mill are thrown by hand on to the ingoing nip of the calender, stick to one of the rolls, and are drawn into the nip and there kneaded along with rubber already there into a "bank" of rubber which is progressively squeezed through the narrowly open "nip" between the two rolls, carried around on the back of the roll and thence to the working nip where it is pressed into forcible contact with the fabric to be impregnated or, in the case of tire tube stock, rolled out into a sheet.

This method of feeding leaves the bank of rubber of uneven thickness at different times and of uneven thickness on different longitudinal elements of the roll at one time. This has not been supposed to have any important effect in determining the amount of rubber fed through the part of the nip adjacent to a given part of the bank, but the application of certain measuring devices disclosed in my Patent No. 1,708,074 granted April 9, 1929, discloses the fact that the thickness of rubber emerging from the calender is in fact materially affected by the amount of rubber in the "bank" currently feeding the calender roll at that point.

The purpose and effect of my invention is to render this feed substantially even from moment to moment, and also from one point in the length of the roll to another, and thereby to eliminate this source of unevenness in the web or fabric emerging from the calender. This I accomplish in the following manner:

Adjacent to the calender I place a small mill of the type somewhat similar to that used in milling the rubber initially. The rolls of this may be shorter longitudinally than those of the calender and considerations of expense and convenience will usually dictate such proportions; the apparatus will work, however, with rolls as long as those of the calender itself. The rubber from the ordinary form of mill or from any suitable source, is fed in the usual good sized chunk into this small feed mill, and is distributed by its rotation upon one of its rolls—namely that nearer the calender. When a relatively homogeneous mass of this rubber surrounds the roll the operation of feeding the calender may begin. This consists in cutting off from the rubber-carrying roll of the feed mill a certain number of ribbons or strips and conducting these through troughs or similar conduits to appropriate points on the feed nip of the main calender. The blanket of rubber on the milling roll of the said feed mill closes up by compression of the remaining rubber where these ribbons have been cut out and the process of removing these ribbons may therefore continue until the amount of rubber on the feed mill is so far depleted that it is necessary to throw on another relatively large piece.

The ribbons of rubber emerging from the feed roll and feeding the calender roll are guided to such points, and maintained at such sizes, that there will be a small relatively even bank of rubber across the length of the calender roll, replenished continuously at various points by the incoming ribbons. While this tends to pile the rubber at the exact points of feed, this tendency is not important since the milling action of the calender roll upon the bank of rubber causes an evening out of the depth of the bank so that it does not depart very much from equality of depth across the entire face if the number of feed points is sufficient. The greater the number of strips, of course, the more uniform in size will be the bank of rubber across the rolls.

It will be understood that if the total feed is somewhat less than the requirements of the rubber rolled out into the commercial product then the bank of rubber at the calendar would slowly decrease and the feed would have to be increased correspondingly or it would eventually run out; on the other hand, if the feed is greater in the aggregate than the amount rolled out, the bank will progressively increase and the feed will have to be diminished to suit.

It will be understood that the evenness of the feeding process in the calendar itself will be promoted by this invention through the fact, first, that the bank of rubber remains normally about equal from point to point and from moment to moment so that the tendency to force open the gap and the more important tendency to extrusion of excess of rubber through frictionally established pressure behind remain about the same. This latter will be understood to be greater when the bank is larger and the grip of the rolls upon the rubber is correspondingly increased. Another important equalizing factor with my method and apparatus is the fact that since the bank of rubber remains at about the same amount, feeding in and out at an equalized rate, the kneading action and hence the temperature of the rubber being fed through the rolls, which has a marked effect upon the rate of feed with a given calender gap, remains substantially constant.

These matters of feed will be understood better if the elasticity of the rubber is carefully borne in mind. In other words, if the material rolled were of such a nature as sheet lead for example, the emerging sheet would be of measurably the exact thickness of the gap between the rolls, but in the case of rubber the thickness of the emerging sheet, measured without compression, may be materially different from the thickness of the gap or nip between the rolls. Consideration of this fact will make it more clear why maintenance of steady conditions as to all of the other contributory factors is necessary in order to bring about an even feed—in other words, why setting of the width of the calender gap is not sufficient in itself to insure evenness of the emergent sheet of rubber.

The maintenance of a proper rate of feed of ribbons of rubber from the feed mill to the calender may be accomplished by hand—that is, the width of the individual ribbons as determined by the setting of the cutting knife, or the depth or thickness of all the ribbons, as determined by the setting of the feed mill rolls, may be adjusted. This adjustment would be made from time to time by inspection of the average amount of the bank of rubber in reserve, and of its local amounts at the various feed points on the ingoing nip of the calender roll.

It will be seen that by the method of feed to and from the feed rolls as described above, there is a considerable revervoir of rubber milling about in the feed mill and replenishing the blanket of rubber from which the strips have been cut. Another alternative method of feeding, requiring more careful attention is as follows:

The mill may be run slowly enough so that the emerging bank of rubber constitutes the exact amount that is intended to be fed to the calender. This blanket may then be cut into, say five strips, and the whole of it diverted to feed points on the calender nip. This requires a slower running feed mill and more careful and accurate placement of the pieces of rubber fed to that mill.

The calender rolls are subjected to heavy pressure since there is a material reduction in thickness of the layer of rubber as it passes through the nip between them, and due to this heavy pressure the rubber acts on the rolls in the nature of the uniformly distributed load imposed on a beam supported at its ends, and tends to widen the nip toward its center of length. It has been the usual practice to crown one of the rolls so that its central portion is a few thousandths of an inch larger in diameter than its end portions, the roll distortion or bending due to the rubber pressure being counted on to bring the confronting faces of the rolls at the nip into parallelism so that the calendered rubber layer is not of appreciably different thickness at its center of width than at its edges. The amount of such bending or distortion of the rolls varies, of course, with the amount of the pressure exerted thereon by the rubber and this pressure varies with the size of the bank of rubber maintained at the nip.

According to this invention, therefore, the spacing of the calender rolls may be regulated to preserve the desired size of the bank so as to maintain the confronting faces of the two rolls at the nip as close to parallelism as possible throughout the length of the nip. Since the width of the supply strips passing to the bank from the feeding material, as hereinbefore described, and except for adjustments, remains constant, the size of the bank at the nip of the calender rolls depends on the spacing of the strip feeding rolls which determines for the most part the thickness of the strips produced.

The running weight of the sheet of rubber currently delivered by the calender rolls at any moment depends upon two factors, namely (a) the gap between the calender rolls, and (b) the pressure upon the rubber being fed through that gap, which in turn is determined by the size and consistency of the actual bank of rubber (exclusive of loose fragments) that is being rolled and squeezed toward the said gap frictionally by the action of the said rolls in frictional contact with that bank. The consistency may be supposed to remain constant in a given batch, although this assumption is not exactly true if the mix, and the length of time that the rubber has been out of the milling rolls, and the temperature vary. Mixtures should not vary, but sometimes do; rubber upon standing after milling loses plasticity and regains resiliency, and thereby somewhat changes its behavior; heat promotes plasticity.

All the rubber delivered by the feeding rolls must pass through the calender nip. At any given moment there will be the same delivery from the feed rolls and from the calender nip unless the band is either increasing or decreasing in amount. An equilibrium or equality tends to establish itself between the feed-roll and calender-roll deliveries, but this tendency may not be sufficient actually to establish the equality if the disparity between feed from the feed-rolls and width of opening of calender nip is too great. The reason that this equilibrium tends to establish itself is as follows: Assume that the feed-rolls are delivering a constant amount of rubber to the calender nip, and that at a given moment the calender is delivering a little less; then the remainder goes progressively to building up the bank. The increasing bank gives the rolls an increasing frictional grip on the rubber and increases thereby the pressure with which it is pushed into the nip; this increases the feed through an unchanged nip on account of the plasticity of the rubber, and if the count of the plasticity of the rubber, and if the feed to the calender at the moment initially initial delivery from the calender, a place will be reached, with a larger bank than at first, where the calender will deliver the same amount that it receives and equilibrium will be reestablished with a slightly heavier running weight than at the initial instant, a larger bank, and therefore a heavier pressure tending to force the rolls apart, and hence more bending of the crowned roll and more neutralization of the crown.

Thus it will be seen that the same running weight may be obtained with a certain opening of the calender nip along with a certain size of bank behind that nip; or it may be obtained with a little wider nip and a smaller bank, or with a little closer nip and a larger bank. The smaller the bank, the less the decrowning and conversely.

Also it will be seen that there is a relation between feed,—the primary variable that determines the running weight,—and gap at the nip between the calender rolls that must be maintained if running-weight and flattening out of the crown are both to be held at the predetermined desired values.

According to this invention therefore, means may be provided by which correlated spacing adjustments of the calender rolls and the strip-forming or feed rolls are simultaneously effected. The correlation aimed at will be such that for any running weight within the working range, and any mixture used, the bank of rubber between the calender rolls shall always have a constant value such that the pressure therefrom tending to force the rolls apart shall be such as to neutralize the crown of the roll or rolls, and thus effect substantial parallelism throughout the length of the nip. For any given conditions this means that the absolute size of the bank will always be the same; if the consistency of the mixture varies, the size of bank should vary. The correlation of the feed and calender adjustments will be set mechanically as a function of design at related values determined by experiment, said experiments being interpreted in the light of the above explanation of the relation between calender gap and size of bank in fixing running-weight.

The mechanism for adjusting the strip-forming feed rolls and that for adjusting the calender gap will be so tied in together that any given adjustment of the feed rolls will entail and effect the corresponding adjustment of the calender gap. Besides changes of mix and temperature which act to change the size of the bank necessary to exactly flatten the crown, it is perhaps possible that the spacing of the calender rolls may have some bearing on the size of bank required. Whether or not this is true, variations in necessary bank size may occur so that means to permit a variation of feed to the bank without reference to the spacing of the calender rolls may be found desirable. According to this invention, therefore, means may be provided for varying the amount of rubber fed to the bank in order that the bank may be maintained at the proper size. This may well be done by changing the spacing between the feed rolls to change the thickness of the strips fed, this being usually more convenient than to change the width of the strips by adjustment of the spacing of the cutters, and as changes in thickness of the calendered rubber caused by changing the width of the calender roll nip require corresponding changes in the rate of feed, the spacing of the preparing rolls and the calendering rolls may be accomplished simultaneously.

Means may also be provided by which adjustments of the roll spacing may be made automatically in accordance with variations in the running weight of rubber sheeted or applied to fabric by the calender so that this running weight may be held constant within predetermined narrow limits. By this invention, therefore, it is possible to maintain the running weight of the rubber within close limits and also to maintain the sheet of rubber or fabric treated with rubber of a uniform weight crosswise of its direction of travel and this with an accuracy which it has hitherto been found impossible to attain.

For a more complete understanding of this invention, reference may be had to the accompanying drawings in which—

Figure 1 is a somewhat diagrammatic view with parts broken away of the feed preparing and calender rolls.

Figure 2 is a diagrammatic longitudinal section of the same mechanism shown to a smaller scale.

Figure 3 is a fragmentary top plan showing the feed of the rubber strips from the preparing rolls to the calender rolls.

Figure 4 is a somewhat diagrammatic view illustrating automatic control mechanism responsive to the running weight of the rubber leaving the calender.

Figure 5 is a diagrammatic detail showing a modification of the control mechanism.

Referring to the drawings 1, 2 and 3 indicate superposed rolls of a rubber calender, the rubber being fed to the ingoing nip between the rolls 1 and 2 from whence it passes about the roll 2 and through the nip between the rolls 2 and 3. Where the calender is employed to form a rubber sheet, the rubber passes directly in sheet form from the nip between the rolls 2 and 3. Where the calender is employed to apply rubber to a fabric, as for example when the calender is a friction calender, the fabric is passed through the nip between the rolls 2 and 3 as shown at 4 and receives a coating of rubber from the roll 2, the fabric and rubber coating then moving together as shown at 5. It should be understood that the present invention is equally applicable to calenders which are employed to sheet the rubber and calenders which are employed to coat fabric with rubber. As heretofore operated, rubber has been supplied to the ingoing nip between the rolls 1 and 2 in such quantity as to produce a "bank" of rubber on the ingoing side of the nip, such a bank being shown at 6 in Figures 2 and 4. Heretofore the rubber has been supplied to this bank in sheeted masses, the size of the bank varying considerably from time to time, being relatively large when a new supply has been recently made and relatively small about the time an additional amount of rubber is to be added to the bank. Not only has the bank, as heretofore maintained, varied in size from time to time at any portion of the nip but it has also varied materially at the same time from point to point along the nip, an additional mass of rubber being applied to the nip to replenish the bank whenever it became small at any particular point along its length. According to the present invention, however, the bank is maintained of substantially uniform size from time to time and also from point to point along its length.

Means for accomplishing this, as shown, comprises a pair of rolls 10 and 11 which are shown as arranged in a substantially horizontal plane and considerably further spaced than the calender rolls 1 and 2. These rolls 10 and 11 are arranged to be rotated by any suitable means, not shown, and to the ingoing nip of these rolls is supplied a mass of rubber 12 which as shown is contained within a hopper 15 extending along the nip between these rolls. This rubber should have been previously milled to substantially the proper condition for the calendering operation. The rolls 10 and 11 while in some instances termed "milling rolls" in this application as a matter of convenience, and because of their great similarity in arrangement to the ordinary rubber mill, are preferably not called upon to perform any material milling operation but only to condition the rubber into such form that it may be supplied in substantially uniform amount to maintain the bank at the nip of the calender rolls 1 and 2 of substantially uniform size longitudinally and from time to time. Since the rolls 10 and 11 are spaced a substantial distance apart they are not called upon to perform the relatively heavy duty required of the calender rolls, the rubber passing through the nip between them and forming a sheet on the surface of one of these rolls, herein shown as the roll 11. This rubber sheet is of substantially uniform thickness, variations in the amount of rubber in the hopper 15 exerting no effect of importance on the thickness of the sheet where the sheet is of the thickness herein desired. Means are then provided for removing the rubber from the roll 11 in strips of determined width, these strips being fed to a multiplicity of points spaced along the bank at the nip of the calender rolls. Means for accomplishing this purpose is shown in Figure 1. Supported in any suitable manner parallel with the axis of the roller 11 is a bar 20 having adjustably spaced therealong a plurality of cutter heads 21. Each of these cutter heads has a depending knife portion 22 which engages the rubber on the surface of the roller 11 and acts to slit it as the roll rotates. As shown these cutters are arranged in spaced pairs, each pair defining by its cutting action a rubber strip which is removed from the surface of the roller 11 and led by any suitable means, as a trough 23, to the bank of rubber 6 at the calender. The strips of rubber between successive pairs of cutters are preferably permitted to remain on the surface of the roll 11 and as the roll revolves this remaining portion commingles with the rubber passing through the nip from the hopper 15, both together producing a sheet continuous across the nip on the surface of the roller 11. By adjusting the spacing of the pairs of cutters, as by means of the control rods 24 fixed thereto, the width of any of the strips led to the bank at the calender may be adjusted as desired, more or less of the rubber remaining on the roll between the strips removed in accordance with the spacing adjustment of the cutters. By permitting some of the rubber to remain on the roll surface any one of the strips removed therefrom may be adjusted in width without disturbing the adjustment for width of any other strip, but of course, if desired, all the rubber might be removed from the roll in strip form and fed to the calender, in which case adjustment of the width of one strip would change the width of one or more of the remaining strips. The strips which are taken from the surface of the roll 11 and led to the bank at the calender rolls are distributed along the length of this bank substantially uniformly, and a sufficient number of strips should be used so that this bank may be maintained of substantially uniform size from end to end of the calender nip. In Figure 3 five such strips are shown led to five points spaced substantially uniformly along the length of the calender roll. The greater the number of these strips the closer together are the feed points along the bank and the more closely uniform may this bank be maintained. The calendered rubber being much thinner (its proportional thickness being exaggerated in the drawing) an adequate supply over the entire width of the calender is afforded by a much smaller aggregate width of the supply strips. By adjustment of the cross sectional areas of the strips as by adjusting the spacing of the cutters, the amount of rubber fed at any particular point along the calender nip may be regulated as desired. Not only may the widths of the strips be varied, but provision may also be made for adjusting the spacing between the rollers 10 and 11, so that the thickness of the strips may also be varied. This latter adjustment provides for material changes in the amount of rubber which it is desired to supply to the bank. As shown in Figure 1 the roller 10 is adjustable toward and from the roller 11, adjustment being effected by the rotation of a handwheel 25 fixed to a threaded shaft 26 carrying the bearing 27 for the roll 10, the opposite end of the roller 10 being preferably simultaneously adjusted, a gearing connection including a transverse shaft 28 connecting the mechanisms at opposite ends of this roller being shown for this purpose.

The action of the calender rolls on the rubber causes the rollers to be subjected to a very substantial pressure, sufficient in fact to cause a certain distortion or bending of the rolls, particularly the upper roll, which constitutes in effect a beam supported at its ends and uniformly loaded along its length. This bending or distortion of the rolls, were it not compensated for, would result in the width of the nip being greater toward its center than at its ends. In order to prevent this, it has been customary to crown the upper calender roll so that its mid-diameter is a few thousandths of an inch greater than its diameter adjacent to its ends. The pressure exerted on the roll, however, is dependent on the size of the bank of rubber, so that it is evident that if the crown is sufficient for one pressure represented by a certain size of bank, it will not correct for a different pressure represented by a bank of different size.

Mechanism for accomplishing this is illustrated in Figure 4. Referring to this figure, it will be seen that the upper calender roll 1 is journaled in vertically adjustable boxes, one of which is shown at 30, this box being shown as mounted for vertical movement in a roll side frame member 31. This box 30 has threaded therethrough a screw shaft 32, which is connected through a suitable reduction gearing shown generally at 33 with a motor 34. By rotation of this motor in one or the other direction, it is evident that the screw shaft 32 will be moved correspondingly, so as to raise or lower the box 30. As shown the upper end of the screw shaft 32 has a bevel gear 40 thereon which meshes with a mating gear on a transverse shaft 41. This transverse shaft may be connected to a screw shaft at the opposite roll side frame similar to the screw shaft 32 and on which a journal box for the opposite journal of the roll may be carried, thus to cause simultaneous vertical adjustments at both ends of the roll 1. This shaft 41 has fixed thereon a sprocket wheel 45 over which passes a drive chain 46 engaging a sprocket wheel 47 carried by the transverse shaft 48, this shaft being geared to a screw shaft 49 similar to the screw shaft 26 shown in Figure 1 and by rotation of which the roll 10 may be adjusted to and from the roll 11. By proper control of the motor 34, therefore, the spacing of the calender rolls 1 and 2, and the preparing rolls 10 and 11 are simultaneously effected.

It may be desirable, also, to change the spacing of the preparing rolls 10 and 11 independently of the spacing of the calendering rolls, as, for example, when changing from one to another quality of rubber. For this purpose the journals of the rolls 11 may be carried by boxes 270 adjustable in guides toward and from the roll 10 as by means of hand operated threaded rods 271.

It may be desirable to control the spacing of these sets of rolls automatically in accordance with the running weight of the rubber sheet being formed, or of the rubber deposited on the fabric in case the calender is used for fabric coating. Where this is desired a sensitive measuring mechanism for measuring the running weight of the rubber leaving the roll 2 may be utilized to effect automatic control of the roll spacing. A weighing mechanism particularly suitable for this purpose is that disclosed in my patent hereinbefore mentioned, for indicating and controlling method and mechanism for paper making machines and the like. Such a mechanism is shown somewhat diagrammatically as applied to the rolls in Figure 4. Referring to this figure at E is shown diagrammaticaly a form of exciting oscillatory electric circuit, oscillations being produced by means of a three element tube at 50, this oscillatory exciting circuit being of any suitable type, such as might be used as a low power radio sending station. For best results it should be of a type as stable as possible. As illustrated, it is of a type more completely shown and described in the application for patent of R. F. Field, Serial No. 227,694 filed October 21, 1927, in which the power is derived from an ordinary 110 volt lighting circuit. Coupled in responsive relation to this exciting circuit is a pick up circuit embodying therein an inductance 55 and condenser comprising a pair of uniformly spaced plates 56 and 57 between which the sheet of rubber or combined fabric and rubber coming from between the calender rolls 2 and 3 passes, a tuning condenser 58, and a thermo-ammeter or other suitable current-indicating device responsive to high frequency currents shown at 60. As more fully pointed out in my patent hereinbefore referred to, variations in the running weight of material passing between the condenser plates 56 and 57 producing variations in the tuning of the pick-up circuit cause corresponding current variations therein, it being understood that the pick-up circuit and the exciting circuit are maintained sufficiently close to resonance with each other so that appreciable current flow is always induced in the pick-up circuit by the exciting circuit. As shown, the thermo-ammeter 60 is provided with an indicating needle which moves over a scale and indicates by its movement thereover variations in running weight of material passing between the condenser plates 56 and 57. This indicator may be calibrated to read directly in terms of running weight. This indicator is caused to effect by its movements, control of the motor 34 in such a manner as to tend to maintain the running weight of material passing between the plates 56 and 57 substantially constant between narrow limits. Two general methods of using the thermo-ammeter in this way are shown in Figures 4 and 5. In Figure 4 a lever arm 65 is shown as fixed to the indicator needle shaft, the indicator being shown at 63, this arm having at its ends contact points 66 and 67. Journaled concentricaly with the fulcrum of the arm 65 is shown a disk 68 carrying a pair of spaced cups 70 and 71, each of these cups being adapted to contain a globule of mercury as 72 and 73 within which the contact points 66 and 67 may dip as the arm 65 is rocked about its fulcrum in response to current variations in the thermo-ammeter. These cups 70 and 71 are connected in a pair of relay circuits including switches 74 and 75, each of these relay circuits being closed by the dipping of the corresponding point 66 or 67 in the mercury globule 72 or 73, thus causing the corresponding switches 74 or 75 to be energized. The closing of either of these switches causes the circuit to be closed through motor 34, closing of one of these switches 74 causing the motor connection to be established for rotation of the motor in one direction, and closing of the other switch closing connections to rotate the motor in the reverse direction. Thus upon an increase of running weight of material passing between the condenser plates 56 and 57 beyond a predetermined point, the motor 33 is rotated in the direction to decrease the width of the nip between rolls 1 and 2 and to decrease the width of the nip between preparing rolls 10 and 11, while a decrease of running weight beyond a predetermined limit causes the motor to be run in reverse direction and the nips between rolls in the two sets widened.

In order to prevent excessive over correction, a correction movement not being immediately effective at the condenser plates 56 and 57, a follow-up mechanism which tends to open the motor switch after it has been closed for a short period is provided. As shown this follow-up mechanism comprises a motor 80 having its shaft 81 provided with a worm engaging worm teeth 82 on the periphery of the disk 68. This motor 80 is connected in parallel with the motor 34 so that whenever the motor 34 is operated the motor 80 is also operated, and in a direction to move the contact cup through which contact has been made with the point on the arm 65 away from this point so as to break the contact therebetween and cause the stopping of the motor. As soon as this breaking of the contact has been effected both the motors 34 and 80 stop. If the correction has been insufficient the lever 65 is caused by an increase of current flow to tilt further in the same direction, re-establishing the contact and causing a further correcting movement of the rolls to take place. If the correction has been too great, the lever 65 rocks in the opposite direction and contact is made through the other contact cup, and the motors are both driven in the reverse direction.

In Figure 5 a different mechanism is employed in which at predetermined time intervals the mechanism is put into condition such that if the running weight is too high or too low, the motor 34 will be actuated for a definite time interval in a correcting direction. Referring to Figure 5, it will be seen that the pointer 63 has movable therewith a contact arm 90. Co-operating with this arm is a plunger 91 carrying a pair of contacts 92 and 93. By means of a suitable timing mechanism herein shown as a clock 94, a circuit is periodically closed through a solenoid 95 which acts to depress the plunger 91, periodically toward the pointer 90. If this pointer is rocked from its mid-position to a sufficient extent in either direction, it contacts with either one or the other of the contact members 92 and 93. When contacting with the member 92 representing excessive sheet weight it closes a relay circuit through a switch 96, this closing the circuit to the motor 34 in a manner to cause this motor to run the correcting direction to narrow the nips, as hereinbefore described. If the contact is made between the members 90 and 93, a switch 97 is closed, which closes the circuit through the motor 34 in a manner to cause this motor to run in the opposite direction and widen the nips. By causing the plunger to move against the end of the arm 90, the free movement of this arm due to current changes in the pick-up circuit is not interfered with during the time intervals when the plunger is raised and consequently it is free to take up its current-responsive position. The movement of this pointer in either direction is not relied upon to exert contact pressure to close the relay circuits, nor does this mechanism require any follow-up device since the length of time during which the motor 34 is energized is controlled by the time the plunger 95 is depressed. If the correction has been inadequate, the motor running too short a time, the same contact is made on the next depression of the plunger and a further correcting movement of the motor 34 is then given. Should the correction be too great a succeeding depression of the plunger will cause the opposite contacts to be made and a reverse correction motion will be given to motor 34.

Certain methods of procedure and certain mechanisms illustrative thereof and by way of example utilized in connection therewith having thus been described, it should be evident that wide variations in method or mechanisms, or both, may be made without departing from the spirit or scope of this invention as defined by the appended claims.

I claim:

1. The method of calendering rubber between rolls which comprises forming a bank of rubber at the ingoing nip of said rolls, and feeding rubber to said bank continuously at each of a plurality of points therealong at a rate to maintain said bank of substantially uniform size from end to end.

2. The method of calendering rubber between rolls which comprises reducing the rubber to a sheet of substantially uniform thickness, cutting said sheet into strips, establishing a bank of rubber at the ingoing nip of said rolls, and continuously feeding said strips to said bank at a plurality of positions therealong and at a rate to maintain said bank of substantially uniform size throughout its operative length.

3. A mechanism of the class described comprising a rubber calender having a pair of rolls forming a nip therebetween, and means for continuously feeding rubber to the nip between said rolls to maintain a bank of rubber at said nip, means for adjusting the width of said nip, and means for adjusting the rate of feed thereto simultaneously with the adjustment of nip width to maintain the size of said bank substantially constant.

4. A mechanism of the class described comprising a rubber calender having a pair of rolls forming a nip therebetween, means for forming the rubber into a continuous sheet of substantially uniform thickness, means for slitting the sheet into strips, and means for presenting said strips to the ingoing side of said nip at a plurality of points thereon to maintain a bank of rubber of substantially uniform size along said nip.

5. A mechanism of the class described comprising a rubber calender having a pair of rolls forming a nip therebetween, means for forming the rubber into a continuous sheet of substantially uniform thickness, means for slitting the sheet into strips, means for presenting said strips to the ingoing side of said nip at a plurality of points thereon to maintain a bank of rubber at substantially uniform size along said nip, and means for adjustably determining the cross sectional areas of said strips.

6. A mechanism of the class described comprising a rubber calender having a pair of rolls forming a nip therebetween, means for forming the rubber into a continuous sheet of substantially uniform thickness, means for slitting the sheet into strips, means for presenting said strips to the ingoing side of said nip at a plurality of points thereon to maintain a bank or rubber at substantially uniform size along said nip, and means for adjusting the spacing of said slitting means.

7. A mechanism of the class described comprising a rubber calender having a pair of rolls forming a nip therebetween, means for forming the rubber into a continuous sheet of substantially uniform thickness, means for slitting the sheet into strips, means for presenting said strips to the ingoing side of said nip at a plurality of points thereon to maintain a bank of rubber at substantially uniform size along said nip, and means for adjustably determining the thickness of said sheet.

8. A mechanism of the class described comprising a rubber calender having a pair of rolls forming a nip therebetween, means for forming the rubber into a continuous sheet of substantially uniform thickness, means for slitting the sheet into strips, means for presenting said strips to the ingoing side of said nip at a plurality of points thereon to maintain a bank of rubber at substantially uniform size along said nip, means for adjustably determining the thickness of said sheet, and means for adjusting the spacing of said slitting means.

9. In combination with the rolls of a rubber calender, a pair of rolls by which the rubber to be calendered is sheeted, means for continuously cutting strips from said sheet as formed, and means for conducting said strips to the nip between said calender rolls at points spaced therealong.

10. In combination with the rolls of a rubber calender, a pair of rolls by which the rubber to be calendered is sheeted, means for continuously cutting strips from said sheet as formed, means for conducting said strips to the nip between said calender rolls, means for adjusting the width of said nip, and means for simultaneously adjusting the spacing of said pair of rolls.

11. In combination with the rolls of a rubber calender, a pair of rolls spaced wider than said calender rolls, means for supplying rubber to the nip between said pair of rolls to pass therethrough and adhere in sheet form to one of said pair of rolls, a series of cutters arranged in spaced relation lengthwise of said one roll in position to slit the rubber sheet on said roll into strips, and means for conducting certain of said strips from said one roll to spaced points along the nip between said calender rolls.

12. In combination with the rolls of a rubber calender, a pair of rolls by which the rubber to be calendered is sheeted, means for continuously cutting strips from said sheet as formed, means for conducting said strips to the nip between said calender rolls at spaced points therealong, means for continuously measuring the running weight of the calendered rubber, and means for automatically adjusting the width of said nip and the spacing of said pair of rolls in accordance with such measurement to tend to maintain said calendered rubber at a constant running weight.

13. In combination with the rolls of a rubber calender, a pair of rolls by which the rubber to be calendered is sheeted, means for continuously cutting strips from said sheet as formed, means for conducting said strips to the nip between said calender rolls at spaced points therealong, means for continuously measuring the running weight of the calendered rubber, and means for automatically adjusting the width of said nip and the cross sectional areas of said strips in accordance with said measurement to tend to maintain said calendered rubber at a constant running weight.

14. In combination with the rolls of a rubber calender, a pair of rolls by which the rubber to be calendered is sheeted, means for adjusting the width of the nip between said calender rolls, means for adjusting the spacing between said pair of rolls, operative connections between said adjusting means whereby actuation of one actuates the other in the same relation, means for continuously slitting into strips the rubber sheeted by said pair of rolls, means for conducting said strips to spaced points along said nip, means for continuously measuring the running weight of the calendered rubber, said measuring means including a member movable in response to changes in such running weight, a motor for actuating one of said adjusting means, and means responsive to the position of said member for controlling said motor to effect correcting adjustment of said nip and said spacing to tend to maintain said running weight at a predetermined value.

15. In combination with the rolls of a rubber calender, a pair of rolls by which the rubber to be calendered is sheeted, means for adjusting the width of the nip between said calender rolls, means for adjusting the spacing between said pair of rolls, operative connections between said adjusting means whereby actuation of one actuates the other in the same relation, means for continuously slitting into strips the rubber sheeted by said pair of rolls, means for conducting said strips to spaced points along said nip, means for continuously measuring the running weight of the calendered rubber, said measuring means including a member movable in response to changes in such running weight, a motor for actuating one of said adjusting means, and means periodically responsive to the position of said member for controlling said motor to effect correcting adjustment of said nip and said spacing to tend to maintain said running weight at a predetermined value.

16. In combination with the rolls of a rubber calender, a pair of rolls by which the rubber to be calendered is sheeted, means for adjusting the width of the nip between said calender rolls, means for adjusting the spacing between said pair of rolls, operative connections between said adjusting means whereby actuation of one actuates the other in the same relation, means for continuously slitting into strips the rubber sheeted by said pair of rolls, means for conducting said strips to spaced points along said nip, means for continuously measuring the running weight of the calendered rubber, said measuring means including a member movable in response to changes in such running weight, a motor for actuating one of said adjusting means, a pair of relay circuits, a switch in each of said circuits acting when its circuit is closed to close the motor circuit to actuate said motor in one direction, the directions being reversed for the two switches, and means acting on the moving of said member in either direction beyond predetermined limits for closing one or the other of said circuits, thereby to effect correctional adjustments tending to maintain said running weight constant.

17. In combination with the rolls of a rubber calender, a pair of rolls by which the rubber to be calendered is sheeted, means for adjusting the width of the nip between said calender rolls, means for adjusting the spacing between said pair of rolls, operative connections between said adjusting means whereby actuation of one actuates the other in the same relation, means for continuously slitting into strips the rubber sheeted by said pair of rolls, means for conducting said strips to spaced points along said nip, means for continuously measuring the running weight of the calendered rubber, said measuring means including a member movable in response to changes in such running weight, a motor for actuating one of said adjusting means, a pair of relay circuits, a switch in each of said circuits acting when its circuit is closed to close the motor circuit to actuate said motor in one direction, the directions being reversed for the two switches, and means for breaking either of said circuits after the closing thereof.

18. In combination with the rolls of a rubber calender, means for feeding rubber to the nip between said rolls at a substantially constant rate and at spaced points along the nip between said rolls, means for continuously measuring the running weight of the calendered rubber, and means controlled by said measuring means for automatically varying the width of said nip and the amount of rubber supplied thereto in accordance with such measurement in a manner to tend to maintain such running weight constant.

In testimony whereof I have affixed my signature.

ALBERT ALLEN.